United States Patent [19]
Alberts et al.

[11] 3,901,954
[45] Aug. 26, 1975

[54] GRAFT COPOLYMERS

[75] Inventors: Heinrich Alberts, Cologne; Herbert Bartl, Odenthal-Hahnenberg, both of Germany

[73] Assignee: Bayer Aktiengesellschaft, Germany

[22] Filed: Mar. 26, 1973

[21] Appl. No.: 345,221

[30] Foreign Application Priority Data
Mar. 30, 1972 Germany............................ 2215604

[52] U.S. Cl............................................ 260/878 R
[51] Int. Cl. ............................................ C08f 15/00
[58] Field of Search ................................ 260/878 R

[56] References Cited
UNITED STATES PATENTS
3,444,108  5/1969  Harris ............................ 260/878 R
3,773,699  11/1973  Bergmeister et al. ............ 260/878 R FOREIGN PATENTS OR APPLICATIONS
917,499  2/1963  United Kingdom ............. 260/878 R Primary Examiner—Joseph L. Schofer
Assistant Examiner—A. Holler
Attorney, Agent, or Firm—Connolly and Hutz

[57] ABSTRACT

Graft polymers are obtained by graft polymerization of 8 to 90% by weight of a mixture consisting of 10 to 70% by weight of (meth)acrylonitrile, 20 to 60% by weight of at least one aromatic vinyl compound, 5 to 60% by weight of at least one monoolefin and optionally further monomers on 92 to 10% by weight of polyethylene in the presence of a polymerization catalyst in homogeneous or heterogeneous phase at temperatures of from −20°C to 250°C and under pressure of up to 500 atm.

7 Claims, No Drawings

GRAFT COPOLYMERS

This invention relates to graft polymers comprising polyethylene as the graft substrate and a mixture of (meth)acrylonitrile, styrene and one or more mono-olefins as the graft monomer, optionally with further monomers, and to a process for the production of these graft polymers.

It is known that styrene and acrylonitrile or mixtures thereof in any ratios can be grafted on to polyethylene. Incompatible graft materials having a low degree of grafting are obtained in the grafting of styrene, whilst incompatible graft products having a very high degree of grafting are obtained in cases where acrylonitrile is used (cf. British Patent Specification No. 917,498).

The level of the grafting yields corresponds to the known monomer radical activity levels. In cases where mixtures of styrene and acrylonitrile are used, incompatible graft products are obtained which differ widely in their degree of grafting. The graft products are distinguished by the fact that a few grafting sites on the polyethylene substrate are attached to long grafting side chains. The mechanical properties and the thermoplastic processibility of products such as these are unsatisfactory.

The object of this invention was to provide graft products based on ethylene homopolymers which, by virtue of their structure and chemical composition, can be processed without difficulty and which have a high mechanical strength, and also show outstanding weather resistance.

According to the invention, this object is achieved by polymerising polyethylene as the graft substrate, whilst polymerising mixtures of acrylonitrile and aromatic vinyl compounds, for example styrene, as the graft monomer in the presence of mono-olefins and, optionally other vinyl monomers, for example, (meth)acrylic acid derivatives, vinyl esters and / or allyl compounds.

Accordingly, the invention provides a process for the production of graft polymers from homopolymers of ethylene and olefinically unsaturated monomers in the presence of a radical former in organic or aqueous medium, distinguished by the fact that mixtures of (meth)acrylonitrile and aromatic vinyl monomers and, optionally, other vinyl or allyl compounds are polymerised together with at least one mono-olefinic hydrocarbon having from 2 to 18 carbon atoms in the presence of ethylene homopolymers.

In the context of the invention, ethylene homopolymers are polyethylenes which can be linear to heavily branched and which have molecular weights from 2000 to 1,000,000 and which are produced by known low-pressure, medium-pressure and high-pressure synthesis processes.

Methacrylonitrile and/or acrylonitrile, aromatic monovinyl compounds such as styrene, nuclear-substituted alkyl styrenes having 1 to 5 carbon atoms in the alkyl radical, for example 4-methyl styrene, α-methyl styrene, halogen styrenes for example 4-chlorostyrene or mixtures thereof, preferably styrene and α-methyl styrene and mono-olefins having 2 to 18 carbon atoms, are used as the graft monomers.

The following mono-olefins are specifically mentioned: ethylene, propylene, 1-butene, 2-butene, isobutylene, 2-methyl-2-butene, 3-methyl-1-butene, diisobutylene, triisobutylene, 1-pentene, 4-methyl-1-pentene, octa-1-decene and cyclopentene.

It is preferred to use α-monoolefins having 2 to 8 carbon atoms, more particularly propylene, 1-butene or isobutylene. It is also possible to use mixtures of the olefins.

(Meth)acrylic acid derivatives may optionally be used as additional vinyl compounds for grafting. (Meth)acrylic acid derivatives include (meth)acrylic acid esters having 1 to 8 carbon atoms, preferably having 1 to 4 carbon atoms, in the alcohol component, (meth)acrylic acid, (meth) acrylic acid amide or mixtures thereof.

Vinyl compounds also include vinyl esters of organic saturated monocarboxylic acids having 2 to 18 carbon atoms. Vinyl acetate and vinyl propionate are mentioned in particular.

It can also be advantageous to carry out the grafting process in the presence of allyl compounds. Preferred allyl compounds include allyl acetate, allyl alcohol and isobutene diacetate.

It is possible to use widely variable quantities of the graft monomer mixture, consisting of (meth)-acrylonitrile aromatic monovinyl compound, monoolefin and, optionally, vinyl and/or allyl compounds, for a given quantity of polyethylene.

It is preferred to use from 7 to 90% by weight of monomer mixture to 10–93% by weight of ethylene homopolymer for the graft polymerisation reaction. Products that are particularly suitable for specific purposes are obtained by using from 60 to 40% by weight of monomer mixture to 40 to 60% by weight of the ethylene homopolymer.

The monomer mixture used for the grafting reaction can have a percentage composition which varies widely within the limits specified.

The monomer mixture used preferably consists of
I. from 10 to 70% by weight, more particularly from 10 to 30% by weight of (meth) acrylonitrile;
II. from 20 to 60% by weight, more particularly from 35 to 60% by weight, of at least one aromatic monovinyl compound;
III. from 5 to 60% by weight, more particularly from 10 to 45% by weight of at least one monoolefin;
IV. optionally up to 30% by weight, more particularly up to 15% by weight, of at least one vinyl compound; and
V. optionally up to 15% by weight, more particularly up to 5% by weight, of at least one allyl compound The sum of components I to V amounting to 100%.

Monomer mixtures of components I–III are of particular interest.

The invention also relates to polymers containing graft polymers of ethylene homopolymer and polymerised units of mixtures of (meth)acrylonitrile, aromatic monovinyl compounds at least one monoolefin having 2 to 18 carbon atoms and, optionally, additional vinyl or allyl compounds.

The polymers preferably contain graft polymers of
A. from 14 to 95% by weight, more particularly from 14 to 55% by weight, of polyethylene; and
B. from 86 to 5% by weight, more particularly from 45 to 86% by weight, of polymerised units of a mixture of
I. 20 to 45% by weight, more particularly 25 to 42.9% by weight of (meth)acrylonitrile and
II. 45 to 79.9% by weight, more particularly 57 to 70% by weight of at least one aromatic monovinyl compound;

III. 0.1 to 10% by weight, more particularly 0.1 to 5% by weight of at least one monoolefin, IV. optionally up to 20% by weight, more particularly up to 15% by weight, more particularly up to 15% by weight, of at least one vinyl compound; and V. optionally up to 10% by weight, more particularly up to 5% by weight, of at least one allyl compound.

The sum of components I to V amounted 100%

Graft polymers containing polymerised units of components 1 to III are of particular interest.

The monomers are essentially grafted on to the graft substrate, however small quantities of homo-and/or copolymers of the monomers can also be present.

The grafting reaction according to the invention can be carried out by introducing and polymerising all the monomers and α-olefins in the presence of the graft substrate. However, it is also possible to add the monomers or their mixtures and the α-olefins to the graft mixture either continuously or in batches. Surprisingly, we have now found that graft products having extremely good mechanical strength values can be obtained, especially where the monomers or their mixtures are added in batches. The radical formers can be added at the beginning of the reaction either all at once or continuously or in batches before, during or after the addition of the monomers. It is also often advantageous to introduce different radical formers during the reaction.

For grafting, the graft substrate should preferably be present in finely divided or dissolved form in order to obtain substantially uniform distribution of the degree of grafting. However, it is also possible, in principle, to start with coarsely granulated polyethylene of the kind which accumulates for example, in the high-pressure polymerisation of ethylene.

If the grafting reaction is to be carried out in solution (homogeneous phase), it is best to use as solvents saturated aliphatic or aromatic hydrocarbons such as ethane, propane, the isomeric butanes, pentanes, hexanes or mixtures, petroleum ether, light gasoline and other gasoline fractions, benzene, toluene, the isomeric xylenes and other substituted benzene derivatives for example chlorobenzene, halogenated aliphatic hydrocarbons such as methyl chloride, methylene chloride, chloroform, carbon tetrachloride, trichlorofluoromethane and other Frigenes, trichlorethylene, tetrachlorethylene and difluoroethylene.

It is also possible, however, to use the monoolefin in such an excess that it acts as solvent itself.

The graft substrates can be dissolved at temperatures in the range of from about 20° to 120°C. Higher temperatures can of course, also be applied where solvents having relatively high boiling points are used or where dissolution is carried out under elevated pressure.

The grafting reaction can also be carried out in heterogeneous phase. In this case, the graft substrate can be used in the form of granulates, spherical particles, in cylindrical form, flake form, spiral form or in the form of other shaped elements.

Where the grafting reaction is carried out in heterogeneous phase, the graft substrates are preferably in power or granulate form having grain size in the range of from about 1μ to about 3 cm.

The graft substrates can be contacted with the monomer mixture by spray-coating, spread-coating, dip-coating or by dispersing the substrate in the monomer mixture, the monomers swelling completely or partly into the substrate. The substrate particles can undergo an increase in volume with their original form substantially intact. For the swelling operation and also for the subsequent grafting operation, the monomer mixture can be present either undiluted or in solution in solvent or dispersed in an organic diluent and/or water. The diluents used here correspond to the solvents referred to above with regard to the grafting reaction. It is also possible to use low-boiling alcohols such as methanol, ethanol, propanol, isopropanol, isomeric butanols, preferably tert.-butanol. Whether complete dissolution occurs or whether the substrate particles merely swell depends on the type and quantity of solvent used, on the temperature, pressure and the type of graft substrate. Naturally, swelling is accompanied by partial dissolution of the substrate particles. However, the dissolved fraction of the individual substrate particle remains substantially in the undissolved fraction of the substrate particle so that, despite an increase in volume, the original form remains intact.

Swelling of the graft substrates can be carried out at temperatures of up to about 85°C, optionally in the presence of the polymerisation catalysts.

Graft copolymerisation can be carried out in homogeneous or heterogeneous phase at temperatures in the range of from about −20°C to +250°C, preferably at temperatures of from +30°C to +150°C, and under pressures of up to 500 atms., preferably under normal pressure (1. atm.) to 21 atms.

It is also quite possible initially to prepare a homogeneous phase from the graft substrate, aromatic vinyl compound or monomer mixture, optionally catalyst and optionally solvent, to disperse the solution in water and then to carry out polymerisation, optionally following addition of the catalyst.

The graft substrate particles swollen by the monomer mixture, optionally in the presence of a radical former, can also be polymerised in the presence of inert or substantially inert gases such as nitrogen or carbon dioxide.

Where graft polymerisation is carried out in heterogeneous phase, the swollen graft substrate is preferably present in solution in an organic solvent or in water or in a heterogeneous or homogeneous mixture of solvent and water.

The polymerisation catalysts can be added to the polymerisation mixture before, during or after the dissolving or swelling operation.

The polymerisation catalysts are preferably used in a quantity of from 0.01 to 1.5% by weight, based on the total weight of graft substrate and graft monomers. These quantities can of course, be considerably exceeded.

Per compounds or radical-yielding azo compounds can be used as the radical formers. The following are mentioned as example: benzoyl peroxide, tert.-butyl perpivalate, lauroylperoxide, tert.-butyl peroctoate, tert.-butylperbenzoate, di-tert.-butyl peroxide, tert.-butyl perisononate, dissopropylpercarbonate, dicyclohexyl percarbonate, acetylcyclohexyl hexane sulphonyl peroxide, dicumyl peroxide and azo-bis-isobutyronitrile. It is preferred to use benzoyl peroxide, tert.-butyl perpivalate, lauroyl peroxide, tert.-butyl peroctoate, dicyclohexyl percarbonate, dicumyl peroxide, and azo-bis-isobutyronitrile.

Conventional redox systems which can be made up of peroxygen compounds (such as potassium persulphate) and inorganic and organic reducing agents, as described for example in Methoden der organischen Chemie, Houben-Weyl, 4th Edition (1961), Vol. 14/1, pages 263–297, are also suitable for carrying out the grafting reaction according to the invention.

Initiator radicals can also be produced by UV-radiation (Which can also be carried out in the presence of peroxygen compounds with or without a sensitiser) X-rays, γ-rays or accelerated electrons.

The polymerisation mixtures can also have added to them the usual auxiliaries such as molecular weight regulators and, in the case of dispersion polymerisation, dispersants, for example ethylene-vinyl acetate copolymers with 45% by weight of vinyl acetate and a high melt index or acrylic ester polymers.

The process according to the invention can be carried out continuously or in batches. The grafting reaction can be carried out either in the presence or absence of solvents in polymerisation screws, whilst evaporation of the solvent or residual monomers from the graft polymerisation mixture can be carried out in evaporation screws, thin-layer evaporators or spray-dryers.

In the process according to the invention, the monomers styrene and/or acrylonitrile are grafted on in quantities of about 50 to 100% by weight and most preferably in quantities of from 80 to 100% by weight.

The α-olefins used in accordance with the invention regulate the grafting reaction so that numerous short grafting side arms are incorporated along the graft substrate. The assumption is supported inter alia by the solution behaviour of the graft products produced by the process of the invention. Where the reaction products obtained by conventional grafting techniques are very frequently insoluble or only partly soluble (even in solvent mixtures), the graft polymer products obtained in accordance with the invention are soluble. If the granulated high-pressure polyethylene used for grafting reaction has a limit viscosity, as measured in tetralin at 120°C, of $[\eta] = 1.01$, the graft polymer products obtained in accordance with the invention are found by measurement under similar conditions to have limiting viscosities of $[\eta] = 0.39$ to $[\eta] = 1.25$. If the melt index of the aforementioned polyethylene is 6.1, melt indices of from 0.01 to 4.25 are obtained in the case of the graft polymer products obtained in accordance with the invention.

The results of fractional precipitation show that the graft products obtained in accordance with the invention have extremely pronounced chemical uniformity.

If the grafting reaction is carried out in the absence of regulating α-olefins with otherwise the same styrene/acrylonitrile ratios, the composition of the reaction product changes drastically. A mixture of ungrafted styrene/acrylonitrile copolymer (frequently more than 50% by weight), unchanged graft substrate and a graft product having relatively few, but very long graft side arms is obtained. Unlike the graft products obtained in accordance with the invention, reaction products of this kind cannot satisfactorily be extruded, injection-moulded or moulded into sheets because these materials show drastic inhomogeneity and incompatibilty and tend towards gel formation during used, thermal process regulation does not involve any difficulties because, in contrast to the unregulated process; no sudden heat effects occur during the reaction Depending on whether grafting is carried out in homogeneous or heterogeneous phase, the products according to the invention accumulate in solution, in dispersion or in the form of plastic compositions. For example, it is possible directly to obtain finely divided thermoplast powders having an average particle size of less than 1000 /μ which are eminently suitable for coating purposes, for a variety of different powder coating processes, for example fluidisation dip coating, flame-spraying and electrostatic powder spraying or for rotational moulding.

The products of the invention are eminently suitable for use as coating materials and thermoplastically processible plastics. Even the graft products with high styrene/acrylonitrile contents can be processed without difficulty in conventional machines of thermoplast technology. By virtue of their outstanding compatibility, some of the graft polymers are extremely transparent. The mechanical strength values are excellent in contrast to the mixtures of the thermoplasts which are known to be totally incompatible and without strength.

The parts and percentages quoted in the following Examples refer to weight unless otherwise stated.

The mechanical values quoted in the Examples are based on the following Standards:

Impact strength according to DIN 53 453 at room temperature, unless otherwise stated.
Notched impact strength according to DIN 53 453 at room temperature, unless otherwise stated.
Dimensional stability under heat according to Vicat, DIN 53 460, in °C (referred to in the Examples as the Vicat temperature).
Ball indentation hardness according to DIN 53 456.
Bending stress according to DIN 53 452.
Tensile strength $\delta_B$ according to DIN 53 455.
Elongation $\epsilon$ according to DIN 53 455.
E-modulus according to DIN 53 457.
Stretching strain $\delta_S$ according to DIN 53 454.

EXAMPLE 1

4 litres of water, 200 ml. of a 10% dispersant solution (solution of a copolymer of methacrylic acid/methacrylic acid methyl ester 1:1), 4000 g of granulated high-pressure polyethylene (melt index 6.1) 67 g of acrylonitrile, 183 g of styrene and 3.75 g of benzoyl peroxide (100%), were introduced under nitrogen into a 12-litre-capacity stirrer-type autoclave. The autoclave was evacuated several times and rinsed with 1-butene. 100 g of 1-butene were then introduced and the mixture was stirred for 3 hours at 70°C under a pressure of 2 atms. and for 6 hours at 85°C/3 atms. After cooling and venting, the grafted granulate, which had retained its original shape, was filtered off, washed free from dispersant with water and then dried. A graft polymer having an acrylonitrile content of 1.5%, a styrene content of 3.5% and a 1-butene content of 0.2% (melt index 0.24) was obtained in a yield of 4220 g.

| $\delta_S$ kp/cm² | $\delta_B$ kp/cm² | $\epsilon$ % |
|---|---|---|
| 117 | 141 | 643 |

Also a not inconsiderable advantage of the process according to the invention is that, where α-olefins are The melt indices were measured in accordance with DIN 53 735 at 190°C under a pressure of 2.16 kp.

In order to determine the grafted component, the ungrafted substrate fractions were separated from the grafted substrate and the ungrafted polymerised monomer units by single and/or double fractional precipitation. To this end, the graft product was dissolved (for example in dimethyl formamide or toluene-dimethyl formamide mixtures) and then successively precipitated under heat for example with n-butanol.

EXAMPLE 2

100 g of high-pressure polyethylene and 400 g of styrene were homogenised at 85°C in a 6-litre-capacity stirrer-type vessel. Thereafter 2000 ml. of a 1% dispersant solution (cf. Example 1) heated to 85°C were added, followed by 300 g of acrylonitrile. Isobutylene (50 g) was then introduced into the apparatus under a slight excess pressure (1 m, water column), and the mixture was stirred for 1 hour at 85°C. 0.2 g of benzoyl peroxide and 2.5 g of tert.-butylperoctoate were then added, and the resulting mixture was stirred at 85°C for 8 hours during which period isobutylene was introduced. After filtration, washing and drying, a bead polymer containing 34% of acrylonitrile, 51.5% of styrene and 0.25% of isobutylene (melt index 0.11) was obtained in a yield of 710 g.

The graft product could be processed into hard, tough coatings and shaped articles.

| Vicat temperature | | 96°C |
|---|---|---|
| Impact strength | (cm.kp/cm$^2$) | 77.3 |
| Ball indentation hardness | (kp/cm$^2$, 30'') | 1281 |

EXAMPLE 3

The procedure was as described in Example 1, 3000 of granulated high-pressure polyethylene, 200 g of acrylonitrile and 300 g of styrene being reacted with 3.75 g of benzoyl peroxide in the presence of 300 g of 1-butene. The mixture was stirred for 3 hours at 60°C/4 atms. and for 6 hours at 85°C/7.0 atms. A graft polymer having an acrylonitrile content of 5.0%, a styrene content of 7.9% and a 1-butene content of 0.1% (melt index 1.51) was obtained in a yield of 3440. g.

| Vicat temperature °C | 84 |
|---|---|
| $\delta_s$ kp/cm$^2$ | 146 |
| $\delta_B$ kp/cm$^2$ | 149 |
| $\epsilon$ % | 596 |

EXAMPLE 4

200 g of polyethylene powder (melt index 0.49), 100 g of vinyl acetate, 60 g of acrylonitrile, 200 g of styrene and 3.5 g of benzoyl peroxide were introduced into a 3-litre capacity stirrer-type autoclave. The autoclave was evacuated and rinsed three times with propylene. 100 g of propylene were then added, followed by the introduction with cooling of 1000 ml. of carbon dioxide. The contents of the autoclave were then stirred for 1 hour at 50°C/80 atms. and then for 5 hours at 85°C/105–117 atms. After cooling and venting, the residual monomers were removed and a graft product which was soluble in a mixture of xylene and dimethyl formamide, softened upwards of 115°C and contained 12% of acrylonitrile, 35.5% of styrene, 8.5% of vinyl acetate and 0.6% propylene was obtained in a yield of 461 g.

As in the preceding and following Examples, the graft base content of the graft polymer was the difference between 100% and the sum of the monomer grafted on.

EXAMPLE 5

300 g of polyethylene powder (melt index 0.49), 500 g of styrene, 150 g of acrylonitrile and 5 g of tert.-butyl peroctoate were stirred together under nitrogen in a 6-litre capacity stirrer-type vessel. 2500 ml. of water 10 ml. of glycerin and 200 ml. of a dispersant solution (Example 1) were then added, again at room temperature. The temperature was adjusted to +20°C and isobutylene was passed through the mixture under a slight excess pressure (200 g). After stirring for 2 hours at 400 r.p.m., 1.6 g of Decrolin dissolved in 50 ml. of water was added from a dropping funnel under nitrogen excess pressure. The mixture was then stirrred for 8 hours at +20°C. A stable dispersion was obtained. The reaction product was isolated by precipitation with hot acidified ammonium chloride solution and carefully washed with water until free from acid and salts. After drying, a graft product having an acrylonitrile content of 13.5%, a styrene content of 50.8% and an isobutylene content of 1.2% (melt index at 190°C 0.12) was obtained in a yield of 870 g.

EXAMPLE 6

4000 ml. of benzene and 350 g of a polyethylene (melt index 6.1) were introduced under nitrogen into a 12-litre capacity stirrer-type autoclave. The autoclave was evacuated and rinsed with 1-butene. 200 g of 1-butene were then introduced, after which the contents of the atuoclave were stirred for 2 hours at 85°C/3 atms. 1460 g of styrene 540 g of acrylonitrile and 12 g of benzoyl peroxide were then added. The mixture was then stirred for 8 hours at 85°C/4 atms. After venting, the benzene and the residual monomers were distilled off until the mixture still just flowed freely. The remaining volatile constituents were distilled off azeotropically with hot steam. The dried reaction product weighed 1820 g and contained 21% of acrylonitrile, 59.2% of styrene and 0.5% of 1-butene (melt index 0.28).

| Vicat temperature | | 92 |
|---|---|---|
| Impact strength | cm.kp/cm$^2$ | 64.2 |
| Ball indentation hardness | kp/cm$^2$ | 1065 |

The following data illustrate the better service properties of the graft copolymers according to the invention compared with graft polymers which do not contain any polymerised units of olefins.

When the reaction described in Example 3 was carried out in the absence of α-olefins, 3450 g of a reaction product with an acrylonitrile content of 5.0% and a styrene content of 8.0% was obtained. The reaction product could not be satisfactoryly extruded because it contained marked inhomogeneities. The mechanical strength values were measured as follows:

| | |
|---|---|
| Vicat temperature °C | 84 |
| $\delta_s$ kp/cm² | 71 |
| $\delta_B$ kp/cm² | 104 |
| $\epsilon$ % | 241 |

Precipitation fractionation shows that this product contains approximately 65% of the quantity of styrene/acrylonitrile used as copolymer, i.e. ungrafted.

EXAMPLE 7

5000 ml. of benzene 1500 g of a high-pressure polyethylene granulate (melt index 6.1) and 1300 g of styrene were introduced into a 12-litre stirrer-type autoclave. The autoclave was then evacuated and the air in it was displaced by rinsing with 1-butene. 400 g of 1-butene was then introduced. The mixture was heated and stirred for 3 hours at 85°C/4 atms. 480 g of acrylonitrile and 9 g of tert.-butylperoctoate were then added. The mixture was stirred for 2 hours at 85°C/4.2 atms. and for 8 hours at 110°C/5.5 atms. The solvent and residual monomers were removed by stripping with hot steam. A graft products having an acrylonitrile content of 13.5%, styrene content of 37.2% and a 1-butene content of 1.0% (melt index 1.26) was obtained in a yield of 3100 g. The reaction product was particularly suitable for the preparation of mixtures.

We claim:

1. A process for the production of a graft polymer from a homopolymer of ethylene and olefinically unsaturated monomers in the presence of a radical former in organic or aqueous medium, wherein a mixture of acrylonitrile, methacrylonitrile or a mixture thereof, at least one aromatic monovinyl compound, at least one monoolefin containing 2 to 18 carbon atoms, 0–30% by weight of another vinyl compound selected from the group consisting of acrylic acid esters and methacrylic acid esters with 1 to 8 carbon atoms in the alcohol component, acrylamide, methacrylamide, acrylic acid, methacrylic acid, vinyl esters of organic saturated monocarboxylic acids containing 2 to 18 carbon atoms and mixtures thereof and 0–15% by weight of an allyl compound selected from the group consisting of allyl alcohol, allyl acetate, isobutene diacetate and mixtures thereof is polymerized in the presence of said ethylene homopolymer.

2. The process as claimed in claim 1, wherein said monoolefin is propylene, 1-butene, isobutylene or a mixture thereof.

3. The process as claimed in claim 1, wherein said aromatic monovinyl compound is styrene, nuclear-substituted alkyl styrene with 1 to 5 carbon atoms in the alkyl radical, $\alpha$-methyl styrene, halogenated styrene or a mixture thereof.

4. The process as claimed in claim 1 wherein 8 to 90% by weight of monomer mixture and 92 to 10% by weight of ethylene homopolymer are used.

5. The process as claimed in claim 1, wherein the monomer mixture to be grafted on consists of a mixture of
I. 10 to 70% by weight of acrylonitrile, methacrylonitrile or a mixture thereof,
II. 20 to 60% by weight of at least one aromatic monovinyl compound,
III. 5 to 60% by weight of at least one monoolefin having from 2 to 18 carbon atoms,
IV. 0 to 30% by weight of said another vinyl compound, and
V. 0 to 15% by weight of said allyl compound.

6. A polymer consisting essentially of an ethylene homopolymer having grafted thereon a mixture of acrylonitrile, methacrylonitrile or a mixture thereof, at least one aromatic monovinyl compound, at least one monoolefin containing 2 to 18 carbon atoms, 0–30% by weight of another vinyl compound selected from the group consisting of acrylic acid esters and methacrylic acid esters with 1 to 8 carbon atoms in the alcohol component, acrylamide, methacrylamide, acrylic acid, methacrylic acid, vinyl esters of organic saturated monocarboxylic acids containing 2 to 18 carbon atoms and mixtures thereof and 0–15% by weight of an allyl compound selected from the group consisting of allyl alcohol, allyl acetate, isobutene diacetate and mixtures thereof.

7. A polymer consisting essentially of
A. 14 to 95% by weight of ethylene homopolymer having grafted thereon
B. 86 to 5% by weight of a mixture of
I. 20 to 45% by weight of acrylonitrile, methacrylonitrile or a mixture thereof,
II. 45 to 79.9% by weight of at least one aromatic monovinyl compound,
III. 0.1 to 10% by weight of at least one monoolefin having from 2 to 18 carbon atoms,
IV. 0 to 20% by weight of a member selected from the group consisting of acrylic acid esters and methacrylic acid esters with 1 to 8 carbon atoms in the alcohol component, acrylamide, methacrylamide, acrylic acid, methacrylic acid, vinyl esters of organic saturated monocarboxylic acids containing 2 to 18 carbon atoms and mixtures thereof and
V. 0 to 10% by weight of an allyl compound selected from the group consisting of allyl alcohol, allyl acetate, isobutene diacetate and mixtures thereof.

* * * * *